(12) United States Patent
Kunz et al.

(10) Patent No.: US 12,042,805 B2
(45) Date of Patent: Jul. 23, 2024

(54) COATING METHOD AND CORRESPONDING COATING INSTALLATION

(71) Applicant: Dürr Systems AG, Bietigheim-Bissingen (DE)

(72) Inventors: Harald Kunz, Bruchsal (DE); Manfred Bauder, Stuttgart (DE); Alexander Spiller, Korntal-Münchingen (DE)

(73) Assignee: Dürr Systems AG, Bietigheim-Bissingen (DE)

( * ) Notice: Subject to any disclaimer, the term of this patent is extended or adjusted under 35 U.S.C. 154(b) by 304 days.

(21) Appl. No.: 17/606,479

(22) PCT Filed: May 7, 2020

(86) PCT No.: PCT/EP2020/062674
§ 371 (c)(1),
(2) Date: Oct. 26, 2021

(87) PCT Pub. No.: WO2020/225350
PCT Pub. Date: Nov. 12, 2020

(65) Prior Publication Data
US 2022/0193709 A1    Jun. 23, 2022

(30) Foreign Application Priority Data
May 7, 2019   (DE) ............... 10 2019 111 760.7

(51) Int. Cl.
*B25J 9/16*    (2006.01)
*B05B 12/12*   (2006.01)
(Continued)

(52) U.S. Cl.
CPC ........ *B05B 13/0431* (2013.01); *B05B 12/122* (2013.01); *B25J 9/1664* (2013.01);
(Continued)

(58) Field of Classification Search
CPC ........ B25J 19/02; B25J 9/1638; B25J 9/1653; G01G 19/52; G01M 1/122; G05B 2219/39194
See application file for complete search history.

(56) References Cited

U.S. PATENT DOCUMENTS

| | | |
|---|---|---|
| 9,643,194 B2 | 5/2017 | Wohr et al. |
| 9,744,560 B2 | 8/2017 | Fritz et al. |
| (Continued) | | |

FOREIGN PATENT DOCUMENTS

| | | |
|---|---|---|
| CN | 108297097 A | 7/2018 |
| DE | 90 01 451 U1 | 6/1991 |
| (Continued) | | |

OTHER PUBLICATIONS

International Search Report and Written Opinion for PCT/EP2020-062674 mailed Aug. 25, 2020 (15 pages; with English translation).
(Continued)

*Primary Examiner* — Abby Y Lin
*Assistant Examiner* — Dylan M Katz
(74) *Attorney, Agent, or Firm* — Bejin Bieneman PLC

(57) ABSTRACT

The disclosure relates to a coating method including the specification of at least one coating path for moving a paint impact point along at least one coating path over the surface, the at least one coating path running through a surface region of the component to be coated which is bounded by edges. The disclosure also includes, presetting reference values of the spatial edge point positions and/or of the edge point orientations of the surface region, spatial measurement of position, orientation and/or shape of the component to be coated or of a part of the component to be coated with a measuring system, where, in the course of the spatial measurement, measured values of the edge point positions and/or of the edge point orientations of the edge points on
(Continued)

the edges of the surface region are measured. Lastly, the disclosure includes determining the deviation between the measured values of the edge point positions and/or the edge point orientations and the reference values of the edge point positions and/or the edge point orientations, and adapting the coating path as a function of the deviation between the reference values of the edge point positions and the measured values of the edge point orientations.

21 Claims, 7 Drawing Sheets

(51) Int. Cl.
    *B05B 13/04*     (2006.01)
    *B25J 11/00*     (2006.01)
    *B25J 13/08*     (2006.01)

(52) U.S. Cl.
    CPC ......... *B25J 9/1697* (2013.01); *B25J 11/0075* (2013.01); *B25J 13/08* (2013.01)

(56) References Cited

U.S. PATENT DOCUMENTS

| | | | |
|---|---|---|---|
| 9,987,640 B2 | 6/2018 | Herre et al. | |
| 10,232,400 B2 | 3/2019 | Wohr et al. | |
| 11,117,160 B2 | 9/2021 | Fritz et al. | |
| 2007/0134430 A1* | 6/2007 | Kenmoku | B05D 1/02 118/313 |
| 2007/0276539 A1* | 11/2007 | Habibi | B25J 9/1612 700/245 |
| 2014/0052294 A1* | 2/2014 | Herre | G05B 19/404 901/43 |
| 2015/0298153 A1* | 10/2015 | Baker | H10K 71/00 118/712 |
| 2015/0328773 A1 | 11/2015 | Boca et al. | |
| 2015/0375239 A1 | 12/2015 | Herre et al. | |
| 2015/0375241 A1 | 12/2015 | Wohr et al. | |
| 2015/0375258 A1 | 12/2015 | Fritz et al. | |
| 2016/0001322 A1 | 1/2016 | Fritz et al. | |
| 2017/0203324 A1 | 7/2017 | Wohr et al. | |
| 2018/0001479 A1* | 1/2018 | Li | B25J 13/089 |
| 2018/0201029 A1* | 7/2018 | Mathis | B41J 2/01 |
| 2020/0094282 A1 | 3/2020 | Fritz et al. | |
| 2020/0134860 A1* | 4/2020 | Haven | G06T 7/0004 |

FOREIGN PATENT DOCUMENTS

| | | |
|---|---|---|
| DE | 10 2013 002 411 A1 | 8/2014 |
| DE | 10 2013 002 412 A1 | 8/2014 |
| DE | 10 2013 002 413 A1 | 8/2014 |
| DE | 10 2013 002 433 A1 | 8/2014 |
| DE | 10 2016 014 944 A1 | 6/2018 |
| EP | 1184139 A2 | 3/2002 |
| JP | 2018502702 A | 2/2018 |
| JP | 2020513315 A | 5/2020 |
| WO | 2014090323 A1 | 6/2014 |

OTHER PUBLICATIONS

Vogel, W.: "Eine interaktive räumliche Benutzerschnittstelle für die Programmierung von Industri-erobotern"; Forschungsberichte IWB Bd. 228, Munich 2009, also dissertation thesis Technische Universität München 2008 (12 pages; with English machine translation).

"CAD-Systeme bilden Basis für Offline-Programmierung" (CAD systems form the basis for offline programming); https://www.computerwoche.de/a/cad-systeme-bilden-basis-fuer-offlineprogrammierung/1157492; archived in https://archive.org/web/ on Apr. 4, 2014 (15 pages; with English machine translation).

Gruhler, Gerhard: "ISW Forschung und Praxis-Sensorgeführte Programmierung bahngesteuerter Industrieroboter."; vol. 67. Springer-Verlag Berlin Heidelberg GmbH, 1987.—ISBN 978-3-662-09860-8 (17 pages; with English machine translation).

German Patent and Trademark Office Search Report for Application No. DE102019111760.7 mailed Jan. 29, 2020 (7 pages; with English machine translation).

Notification of Reasons for Rejection from the Japan Patent Office mailed Jan. 29, 2024 for application No. JP2021-566258 (5 pages; with English translation).

* cited by examiner

COATING METHOD AND CORRESPONDING COATING INSTALLATION

CROSS-REFERENCE TO RELATED APPLICATIONS

This application is a national stage of, and claims priority to, Patent Cooperation Treaty Application No. PCT/EP2020/062674, filed on May 7, 2020, which application claims priority to German Application No. DE 10 2019 111 760.7, filed on May 7, 2019, which applications are hereby incorporated herein by reference in their entireties.

The disclosure relates to a coating method for coating a component (e.g. motor vehicle body component) with a coating agent (e.g. paint). Furthermore, the disclosure relates to a corresponding coating installation.

BACKGROUND

In modern painting installations for painting motor vehicle body components, rotary atomizers are usually used as application devices, which are guided by a multi-axis painting robot with serial robot kinematics along predetermined coating paths over the component surface of the motor vehicle body components to be painted. The motor vehicle body components to be painted are usually conveyed by a linear conveyor along a painting line through the painting installation, whereby the linear conveyor has positioning tolerances. In addition, the multi-axis painting robot also has positioning tolerances. Finally, the motor vehicle body components to be painted also have shape tolerances. As a result, these positioning tolerances can lead to incorrect positioning of the rotary atomizer relative to the vehicle body component to be painted.

Various concepts are known from the prior art for solving this problem, but they are all associated with specific disadvantages.

One known concept involves the motor vehicle body components to be painted being measured by a position detection system prior to painting, whereby the position detection system can operate with four cameras, for example. Depending on the measured position, orientation, and shape of the vehicle body component to be painted, the predefined programmed coating paths can then be adjusted accordingly.

Another known concept involves measuring the motor vehicle body components to be painted using mobile, robot-guided systems, whereby the predefined coating paths can then be adjusted as a function of the measurement result. The measurement of the motor vehicle body components to be painted is carried out in a separate measuring process, independently of the predefined programmed coating paths.

In addition, temperature changes during operation can also lead to incorrect positioning of the robot-guided rotary atomizer relative to the vehicle body components to be painted. For example, the painting robot heats up during operation due to electrical heat loss and friction, which causes the robot geometry to change, resulting in corresponding incorrect positioning. Temperature-related positioning errors of up to 1 mm can occur during robot operation. When using a rotary atomizer, the exact position of the surface to be painted is irrelevant, provided it is not outside the range of the spray cone. However, this does not apply when painting contrast roofs with an overspray-free applicator.

To compensate for these temperature-related positioning errors, it is known from the prior art to measure the robot temperatures cyclically and to adapt the robot model used for calculation as a function of the measured temperature values. In this way, the temperature-related positioning errors can be reduced.

However, the known concepts described above are associated with various disadvantages, which are briefly described below.

Global component measurement using multiple cameras is usually not sufficient to achieve the required positioning accuracy because component tolerances and robot tolerances are not taken into account. For example, the positioning error for painting automotive body components should be less than 1 mm.

In the case of mobile, robot-guided component measurements, only the measured regions can be compensated locally at a time. In large-area applications, however, the component edges make up only a fraction, whereas the enclosed area cannot be measured and compensated for by robot-guided mobile measurements because there are no features (e.g. edges) that can be measured there.

The temperature compensation described above, on the other hand, is very complex and depends on the quality of the artifacts, the number and position of the measurement points and the description of the robot model. In addition, the artifacts are not located directly in the application area, so that the robots are not hindered in their actual measurement task. Such systems for temperature compensation are also relatively complex, expensive and require a high level of maintenance.

For the technical background of the disclosure, reference should also be made to DE 10 2016 014 944 A1; VOGEL, W.: "Eine interaktive raumliche Benutzerschnittstelle für die Programmierung von Industrierobotern" (Forschungsberichte IWB Bd. 228, Munich 2009, also dissertation thesis Technische Universitat Munchen 2008); "CAD-Systeme bilden Basis fur Offline-Programmierung" (CAD systems form the basis for offline programming) (https://www.computerwoche.de/a/cad-systeme-bilden-basis-fuer-offlineprogrammierung/1157492; archived in https://archive.org/web/ on Dec. 4, 2014) and DE 90 01 451 U1.

Finally, GRUHLER, Gerhard: "ISW Forschung and Praxis—Sensorgeführte Programmierung bahngesteuerter Industrieroboter." (Vol. 67. Springer-Verlag Berlin Heidelberg GmbH, 1987.-ISBN 978-3-662-09860-8) discloses a method according to the preamble of claim 1. However, this known method is not yet completely satisfactory.

DETAILED DESCRIPTION

Figure 1:
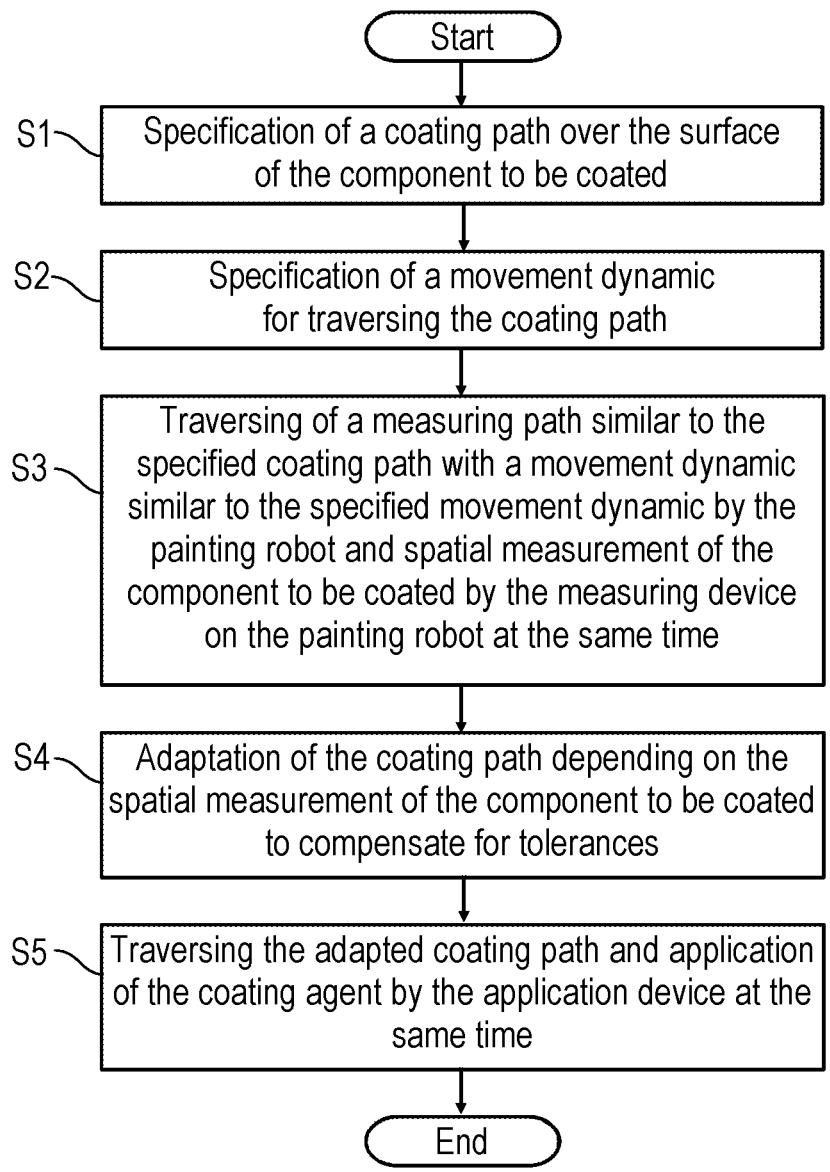
FIG. 1 a flow chart illustrating the coating method according to the disclosure, FIG. 2A a schematic representation of a coating installation according to the disclosure, FIG. 2B an enlarged detailed view of FIG. 2A, FIG. 3 a flow chart to illustrate the actual measuring process, FIG. 4A a component surface without correction of the coating path, FIG. 4B a component surface with corrected coating paths, FIG. 5 a flow chart illustrating a variant of the disclosure, FIG. 6A a component surface, FIG. 6B the component surface according to FIG. 6A, where one half is painted, FIG. 6C the component surface from FIGS. 6A and 6B with the measurement of the other half of the component, and FIG. 6D the component surface from FIGS. 6A-6C with the other half painted.

In the following, details according to the disclosure concerning the actual measuring movement will be explained. Thus, the coating paths and the measuring path usually run through a surface region of the component to be coated, such as a roof of a motor vehicle body, this surface region being delimited by edges which can be measured. Here, reference values of the spatial edge point positions and/or the edge point orientations are specified for edge points on the edges of the surface region. These reference values can, for example, be determined on the basis of a predefined CAD model (CAD: Computer Aided Design) or measured separately. During the measuring movement, the measured values of the edge point positions and/or the edge point orientations of the edge points on the edges of the surface region are then measured. The deviation between the measured values on the one hand and the reference values on the other hand is then determined. The coating path is then adjusted as a function of this measurement.

For example, this adjustment can be done by means of a correction algorithm, which may include, for example, an $n^{th}$-order polynomial with n of 1-6, a cubic spline, a quintic spline, a cubic Bezier curve, or a quintic Bezier curve, to name a few examples.

Details of a possible correction algorithm are described below. The basic idea of the correction algorithm is that the smaller the distance between the measurement point and the path point, the more the correction value of a measurement point affects a path point.

For the correction algorithm, the edges are approximated section by section by straight line equations. In each case two neighboring measuring points define a straight line, which is valid between the two measuring points or—if there is no further measuring point in one direction—also beyond. For the measuring points on the left and right edge, the straight lines are represented in the form $y=f(x)$, for the start and end edge in the form $x=f(y)$. Thus the straight line equations can always be represented as $y=m*x+b$ or $x=m*y+b$ without numerical problems with m towards infinity.

The straight lines are calculated for the programmed measuring points (=measuring points on the zero body) and for the corrected measuring points (=programmed measuring points+correction value from the measuring computer).

For the correction in Y-direction of a path point P, the XP-coordinate is used to determine which section of the equations for the left/right edges belong to this point and then the XP-coordinate is inserted into the corresponding equations.

Left margin: YL=fL(XP) and YKorrL=fL(XP). This gives DeltaL=YKorrL−YL

Right margin: YR=fR(XP) and YKorrR=fR(XP). This gives DeltaR=YKorrR−YR

DeltaL and DeltaR are now weighted by the distance of the path point P from the left and right edges to obtain the correction in the Y direction:

With DistL=ABS (YP−YL) and Dist=ABS(YR−YL) one obtains the weightings
fL=1−DistL/Dis (becomes larger when DistL becomes smaller!)
fR=DistL/Dist
with the property fL+fR=1
Correction value in Y-direction: DeltaL*fL+DeltaR*fR For the correction in X-direction of a path point P, the YP-coordinate is used to determine which section of the equations for the left/right edges belong to this point and then the YP-coordinate is inserted into the corresponding equations.

Start margin: XS=fS(YP) and XKorrS=fS(XP). This gives DeltaS=XKorrY−XS

Right margin: XE=fR(YP) and XKorrE=fE(XP). This gives DeltaR=XKorrE−XE

DeltaS and DeltaE are now weighted by the distance of the path point P from the start and end edges to obtain the correction in the X direction:

With DistS=ABS (XP−XS) and Dist=ABS(XE−XS) one obtains the weightings:
fS=1−DistS/Dist (becomes larger when DistS becomes smaller!)
fE=DistS/Dist
with the property fS+fE=1
Correction value in X-direction: DeltaS*fS+DeltaE*fE For the correction in Z-direction the projection into the XZ-plane with the left and right edge or the projection into the YZ-plane with the start edge and the end edge can be used. In the first case one obtains straight line equations of the form $z=f(x)$, in the second case straight line equations of the form $z=f(y)$. In both planes, the calculation is analogous to the calculation of the corrections in the Y-direction or in the X-direction. Both variants are calculated and the mean value from the results of the two variants is used as the Z-correction.

Furthermore, within the scope of the disclosure, it is possible for the edged surface region (e.g. roof of a motor vehicle body) on the component to be coated to be measured and coated by two coating robots, the two coating robots preferably being arranged on opposite sides of the surface region, for example on opposite sides of a painting line. The surface region can then be divided into two sub-regions that are directly adjacent to each other. For example, this can be a left roof half and a right roof half. The first coating robot then measures the entire surface region or one of the two sub-regions with its measuring system. The coating path is then adjusted depending on the spatial measurement by the first coating robot. The first coating robot then coats the first sub-region (e.g. a roof half) with the coating agent, whereby the first coating robot moves along the optimized, adapted coating path. Subsequently, the second coating robot then measures the second sub-region and adjusts the coating path depending on the spatial measurement. Finally, the second coating robot then coats the second sub-region (e.g. the other half of the roof) with the coating agent. The second robot can measure its remaining application area by measuring the first application path of the first robot, which simultaneously represents the boundary between the two sub-regions.

The disclosure preferably takes a completely different approach to solving the task than the known concepts described above. The known concepts aim to improve the positioning accuracy of the robot, for example by compensating for temperature-related positioning errors. Thus, an attempt is made to bring the actual position of the applicator as close as possible to the specified target position. The approach according to the disclosure, on the other hand, does not consist in generally improving the absolute accuracy of the robot with regard to positioning in order to optimize the application result, but rather in detecting all deviations locally by direct measurement on the component to be painted itself and in increasing the application accuracy by individual adaptation of the robot program. Ideally, the same movement should be used for measuring the component to be applied as for the subsequent application. In this way, the behavior of the robot and the influence of all errors during measurement and application are the same. Here, the exact cause of a positioning error (e.g. deviations in component position, component shape or temperature-related positioning errors) is not important, because the individual measured value reflects the sum of all errors at the respective position, which allows optimal compensation.

The coating method according to the disclosure is preferably used for coating motor vehicle body components. In principle, however, the coating method according to the disclosure is also suitable for coating other types of components.

Furthermore, it should be mentioned that the coating method according to the disclosure preferably serves for painting components. However, the disclosure is also not limited to paints with regard to the type of coating agent, but can in principle also be implemented with other types of coating agents.

In the coating method according to the disclosure, as in the known coating methods, a coating path is specified. For example, the coating paths can be specified by manual "teaching". Alternatively, the coating path can be generated by means of software, for example with an offline programming system. In this case, application paths are automatically generated on the basis of the CAD data, which run over the surface of the component to be coated. The paint impact point of the application device (e.g. rotary atomizer) is then later guided along this coating path over the surface of the component to be coated. The programming of such coating paths is known from the prior art and is also referred to as "teaching" in accordance with the usual technical terminology.

In addition, the coating method according to the disclosure also preferably provides for the component to be coated (e.g. motor vehicle body component) to be measured by means of a measuring system with regard to position in three-dimensional space, orientation and/or shape.

Depending on this component measurement, the programmed coating path is then preferably adjusted accordingly in order to avoid positioning errors.

During the actual application, the application device (e.g. print head or other application device which applies the coating agent with sharp edges and without overspray) is then preferably guided along the adapted coating path over the surface of the component to be coated, preferably by means of a multi-axis coating robot. During this application movement, the application device then dispenses the coating agent onto the surface of the component to be coated.

The term application device is to be understood in a general sense and includes both applicators that atomize the coating agent, for example, by means of air and/or rotating elements, and those that apply coating agent without atomization, such as print heads or those that emit at least one narrowly limited coating agent jet (as described, for example, in DE 10 2013 002 433 A1, DE 10 2013 002 413 A1, DE 10 2013 002 412 A1 or DE 10 2013 002 411 A1).

The coating method according to the disclosure now differs from the known coating method described above with a robot-guided component measurement preferably essentially by the steps for spatial measurement of the component to be coated.

For this purpose, a measuring path is preferably specified which leads over the surface of the component to be coated, whereby the measuring path essentially corresponds to the coating path. To measure the component, a measuring system is then guided along the specified measuring path as part of a measuring movement over the component surface, whereby the paint impact point of the application device follows the specified measuring path, i.e. a measuring sensor follows the measuring path. During this measuring movement, the measuring system then carries out a spatial measurement of the component to be coated.

It is important to note here that the measuring movement preferably corresponds essentially to the later application movement, so that the same temperature-related positioning errors occur during the measuring movement as during the actual application movement. It is therefore no longer necessary to compensate for the temperature-related positioning errors during the actual application movement by means of complex temperature measurements. Rather, the temperature-related positioning errors can be accepted during the actual application movement because they have already been taken into account during the preceding measurement movement.

It has already been mentioned above that the measuring movement preferably corresponds as closely as possible to the subsequent application movement. This applies first of all to deviations between the spatial position of the paint impact point during the measurement movement on the one hand and during the application movement on the other hand. Thus, the spatial deviations between the application movement on the one hand and the measuring movement on the other hand should preferably be smaller than 100 mm, 60 mm, 50 mm, 40 mm, 30 mm, 20 mm, 10 mm, 5 mm, 2 mm, or 1 mm.

However, the measuring movement should preferably not only correspond as closely as possible to the subsequent application movement with regard to the position of the paint impact point. Rather, the orientation of the application device during the measuring movement should also correspond as closely as possible to the later orientation during the application movement. Thus, the angular deviation of the application device during the measuring movement on the one hand and during the application movement on the other hand should preferably be smaller than 45°, 30°, 20°, 10°, 5°, 2° or 1°.

Furthermore, it must be taken into account that a certain position and orientation of the robot-guided application device can usually not only be realized with a single robot pose, but with different robot poses. The term "robot pose" used in the context of the disclosure means the plurality of axis angles of the robot. A certain robot pose can be uniquely defined by a vector, which contains all axis angles of the robot as components. Preferably, the measurement movement is also performed with the same robot poses as the subsequent application movement. Thus, the angular deviations of the individual robot axes between the application movement on the one hand and the measurement movement on the other should preferably be smaller than 20°, 10° or 5°.

In addition, the measurement movement should preferably also take place with the same movement dynamics as the subsequent application movement, i.e. with the same path velocity of the paint impact point, the same path acceleration of the paint impact point, the same axis positions of the robot axes, the same axis velocities of the robot axes and/or the same axis accelerations of the robot axes.

Thus, the deviation of the path velocity of the paint impact point between the measurement movement and the application movement should preferably be smaller than 60%, 50%, 40%, 30%, 20%, 10% or even smaller than 5%. In absolute values, the deviation of the path speed should preferably be smaller than 500 mm/s, 400 mm/s or 300 mm/s. With regard to the path acceleration, the axis speeds of the robot axes and the axis accelerations of the robot axes, the deviations between the measuring movement on the one hand and the application movement on the other should preferably be smaller than 10% or 5%.

The coating path is therefore preferably adapted in such a way that the following tolerances are at least partially compensated:
Position of the component,
shape of the component,
static positioning inaccuracies of the coating robot,
dynamic positioning inaccuracies of the coating robot, and/or
temperature-related positioning inaccuracies of the coating robot.

However, the disclosure does not only claim protection for the coating method according to the disclosure described above. Rather, the disclosure also claims protection for a corresponding coating installation for coating a component. In particular, this may be a coating installation for coating motor vehicle body components.

First of all, in accordance with the prior art, the coating installation according to the disclosure comprises at least one multi-axis coating robot which preferably has serial robot kinematics and can guide an application device (e.g. rotary atomizer) along a predetermined coating path over the component surface of the component to be coated.

In addition, the coating installation according to the disclosure comprises, in accordance with the state of the art, a measuring system for spatial measurement of the component to be coated.

Furthermore, the coating installation according to the disclosure also comprises a control unit for controlling the application device and the coating robot and for interrogating the measuring system.

The coating installation according to the disclosure is characterized by the fact that the control unit controls the coating robot and the application device and interrogates the measuring system in such a way that the coating installation carries out the coating method according to the disclosure.

In this case, the measuring system is preferably robot-guided and mounted on the coating robot and is moved by the coating robot over the surface of the component to be coated. For example, the measuring system can have a light-section sensor or a camera, to name just a few examples.

The application device may be an atomizer (e.g., rotary atomizer). However, it is also possible that the application device is an overspray-free application device which, in contrast to an atomizer, does not emit a spray jet but a spatially narrowly limited coating agent jet. Such overspray-free application devices are known from the prior art of recent times and are also referred to as print heads.

In the following, the flow chart according to FIG. 1 will be explained, which shows the coating method according to the disclosure.

In a first step S1, a coating path is first specified which runs over the surface of the component to be coated and reproduces the desired path of the paint impact point of the application device used (e.g. rotary atomizer). However, the coating path does not only reflect the spatial position of the paint impact point, but also the spatial orientation of the application device along the coating path. The definition of such a coating path is usually done by programming, which is also known as "teaching" in the prior art. However, the coating path can also be defined offline.

In a further step S2, a desired movement dynamic is then specified for the coating path. The movement dynamics here comprises the speed and acceleration of the paint impact point along the specified coating path.

In a step S3, a measuring path similar to the specified coating path is then traversed with similar movement dynamics, whereby a measuring device guided by the painting robot measures the component. It is important here that the measuring movement has the smallest possible deviations from the subsequent application movement, so that the positioning errors during the measuring movement correspond as closely as possible to the positioning errors during the application movement.

In a step S4, the coating path specified in step S1 is then adjusted as a function of the spatial measurement performed in step S3 during the measuring movement.

In a step S5, the optimized coating path is then traversed, with the application device applying the coating agent. Steps S1-S4 thus reproduce the creation, measurement, and optimization of the coating path, while step S5 reproduces the actual application operation.

Figure 2A:
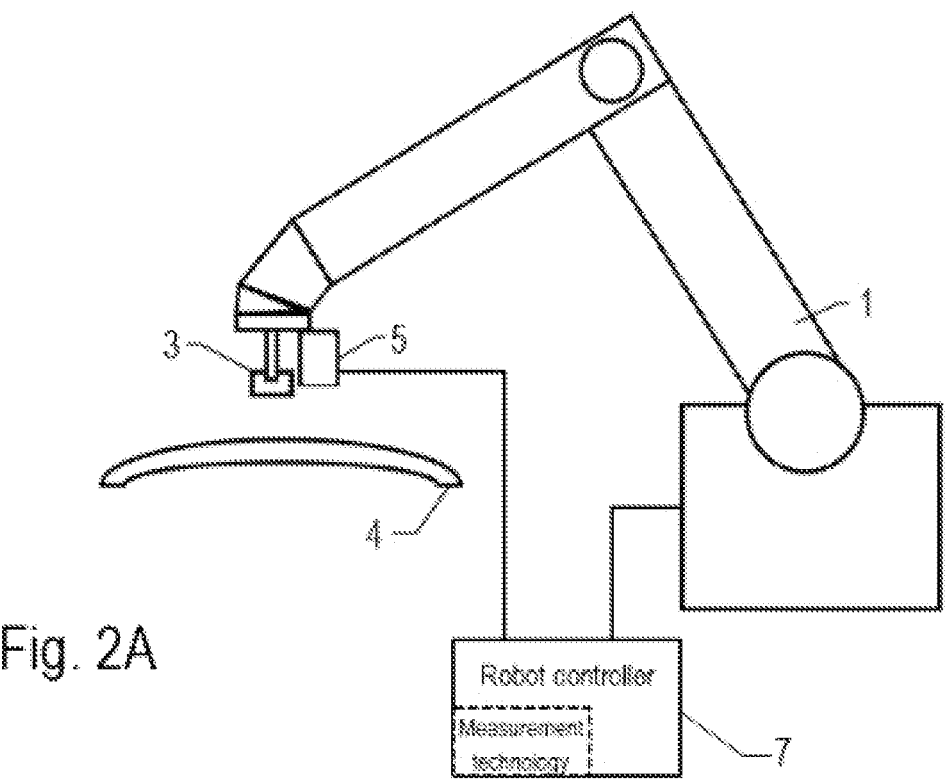
Figure 2B:
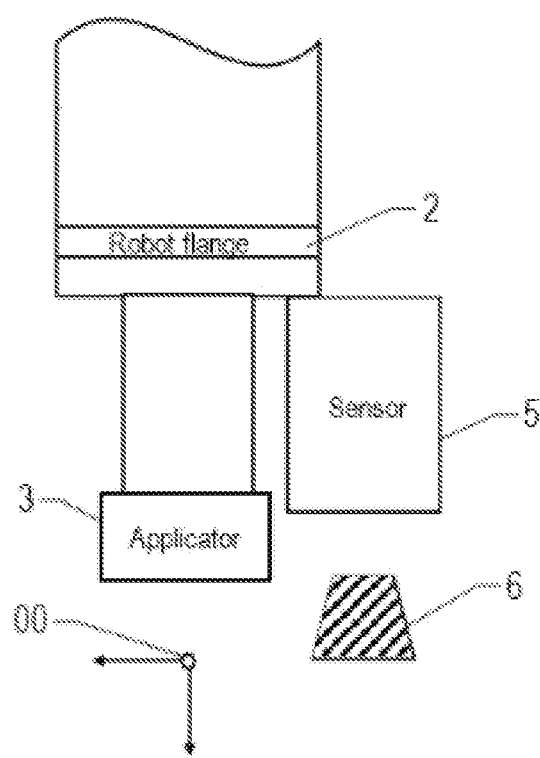

FIGS. 2A and 2B show in schematic form a coating installation according to the disclosure with a coating robot 1 with a robot flange 2 and an applicator 3, such as a rotary atomizer, attached to the robot flange 2. In operation, the applicator 3 applies a coating agent to a component 4, which is shown here only schematically.

In addition, a sensor 5 is attached to the robot flange 2, which has a sensor measuring window 6 and enables measurement of the component 4. For example, the sensor 5 can be a camera-based sensor, but a light-section sensor is also possible, for example.

Furthermore, the coating installation comprises a control unit 7 that includes a robot controller to control the coating robot 1. Furthermore, the control unit 7 includes measurement technology to interrogate the sensor 5. The measurement technology is not necessarily integrated into the robot control unit. Rather, it can be located in an independent system/PC.

The control unit 7 then controls the coating robot 1 and interrogates the sensor 5 in such a way that the coating method according to the disclosure is carried out.

Figure 3:
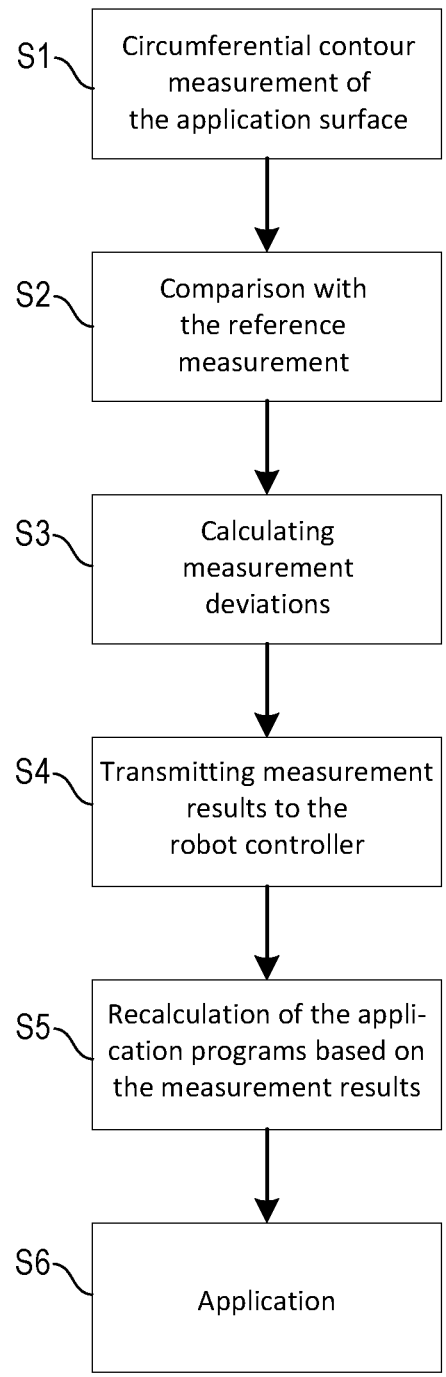
Figure 4A:
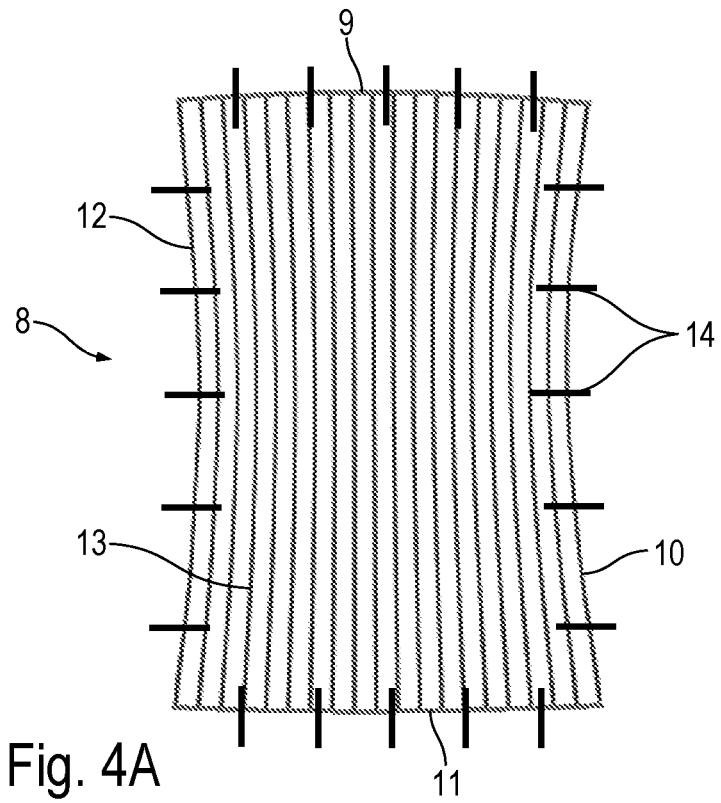

In the following, the flow diagram according to FIG. 3 is now described, with reference to FIGS. 4A and 4B.

In a first step S1, a circumferential contour measurement of a component surface 8 is carried out, wherein it can be, for example, a roof of a motor vehicle body.

The component surface 8 has edges 9-12 which delimit the component surface 8.

Predefined coating paths 13, which are only shown schematically here, run within the component surface 8.

In a step S1, a circumferential contour measurement of the component surface 8 is performed, whereby edge points 14 on the edges 9-12 of the component surface 8 are measured.

In a step S2, the coordinates of the measured edge points 14 are then compared with a reference measurement, whereby the corresponding reference values can be specified, for example, by a CAD model.

In a step S3, the deviations between the measured values of the edge points 14 and the predetermined reference values are then calculated.

In a step S4, the measurement results are then passed on to a robot controller.

In a step S5, the coating paths 13 are then recalculated to take positioning errors into account.

In step S6, the actual application is then carried out with the optimized coating paths 13.

Figure 4B:
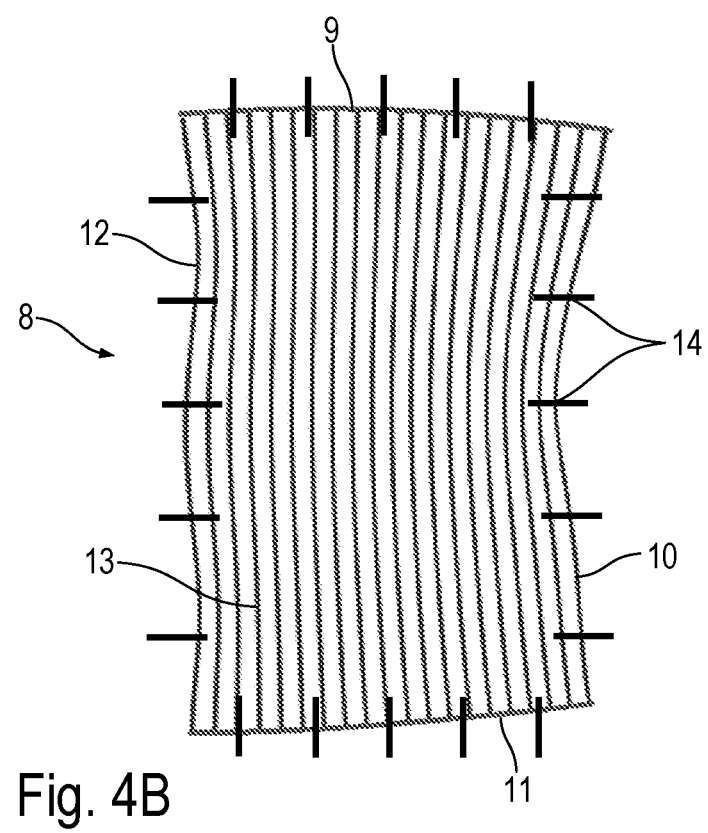

FIG. 4B shows the corresponding deformed coating paths 13 according to the optimization.

Figure 5:
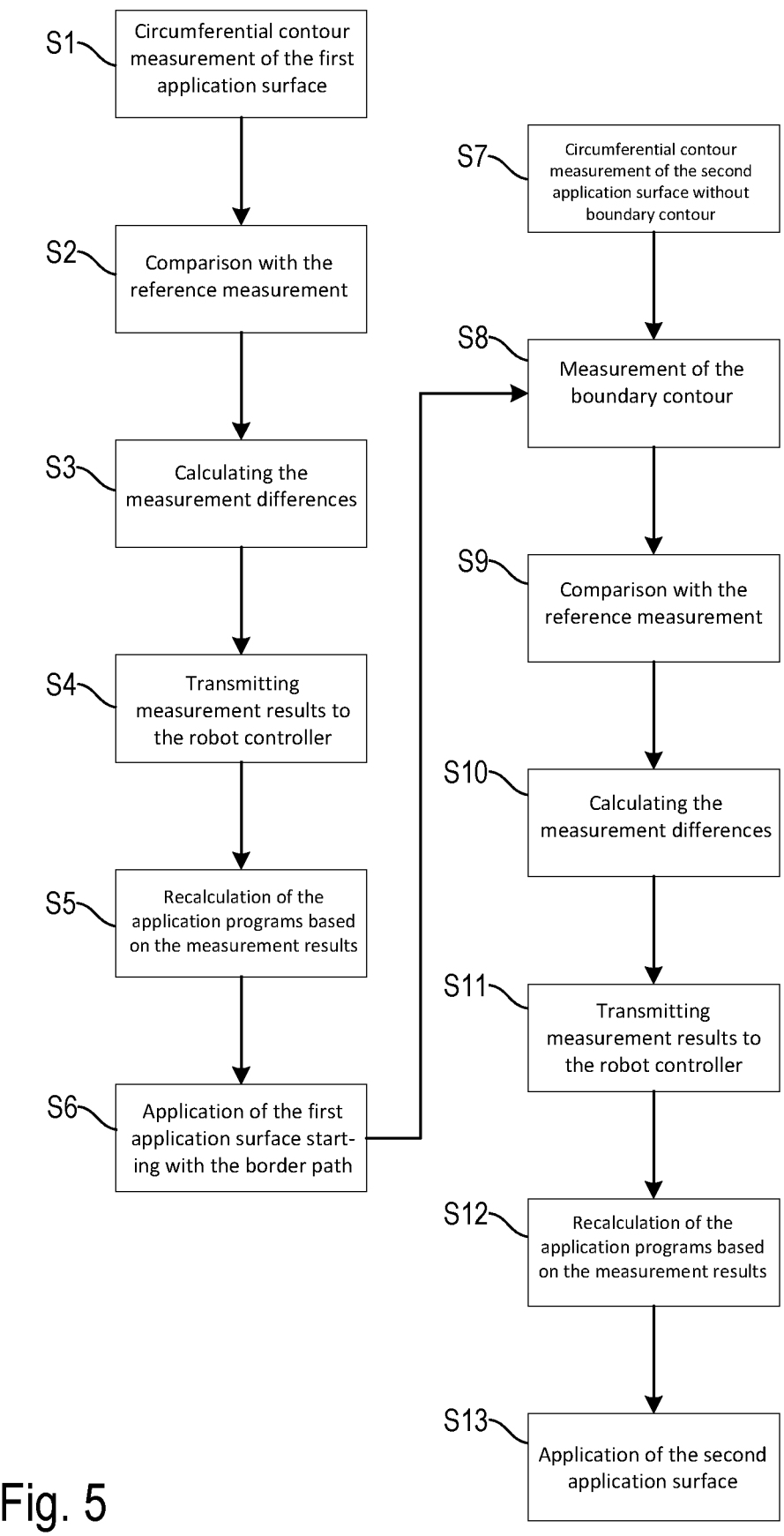

In the following, the flow chart according to FIG. 5 is described, with reference to FIGS. 6A to 6D.

It should be mentioned here that in this variant of the disclosure the coating method is carried out by two coating robots which are arranged on opposite sides of a painting line.

The component surface 8 is divided here into two sub-regions A, B, whereby it can be, for example, a left and a right roof half of a motor vehicle body.

Figure 6A:
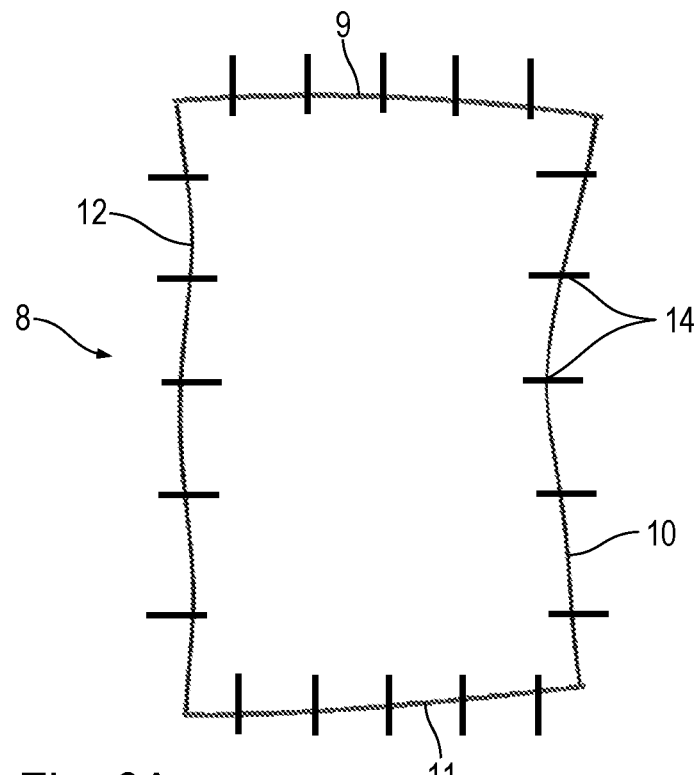

In a step S1, a circumferential contour measurement of the first sub-region A of the application area, for example of the right half of the component surface 8 shown in FIG. 6A, is first carried out.

In a step S2, the coordinates of the boundary points 14 are then compared with the corresponding coordinates of the reference values in the manner already described above.

In a step S3, the measurement differences are then calculated.

In a step S4, the measurement results are transmitted to a control unit, which then recalculates the coating paths in sub-region A (e.g. right half of the roof) in a step S5.

Figure 6B:
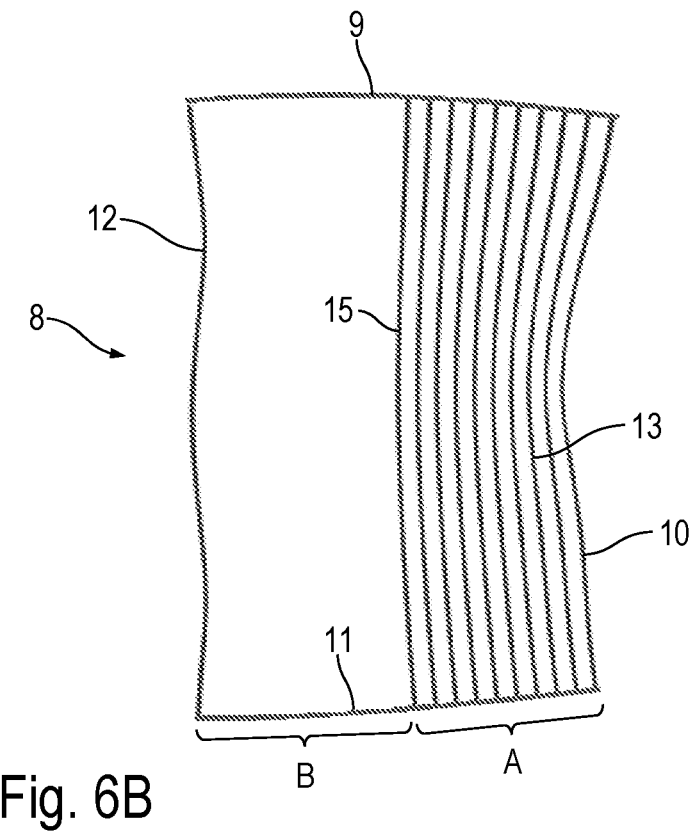
Figure 6C:
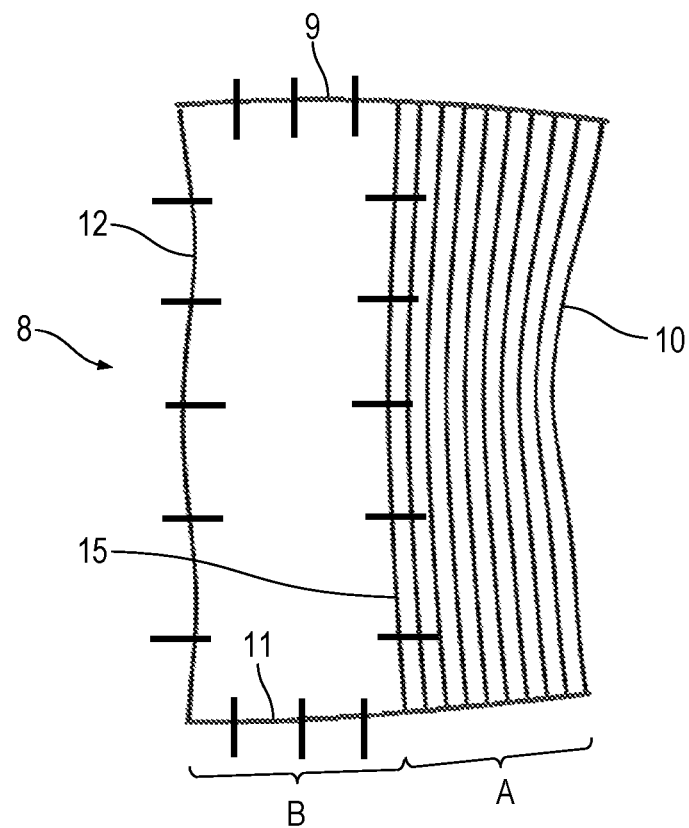

In a step S6, the subarea A is then coated, as shown in FIG. 6B.

In a step S7, a contour measurement of the second sub-region B of the component surface 8 is also carried out, which may be the other half of the roof, for example.

In a step S8, a comparison is then made with the boundary contour, which may be a coating path 15 previously painted in step S6, which coating path 15 may be independent of the coating path 13.

In step S9, a comparison is again made with the reference measurement and the measurement differences are calculated in step S10.

Subsequently, the measurement results are transmitted to a control unit in step S11, which then recalculates the coating paths in step S11.

Figure 6D:
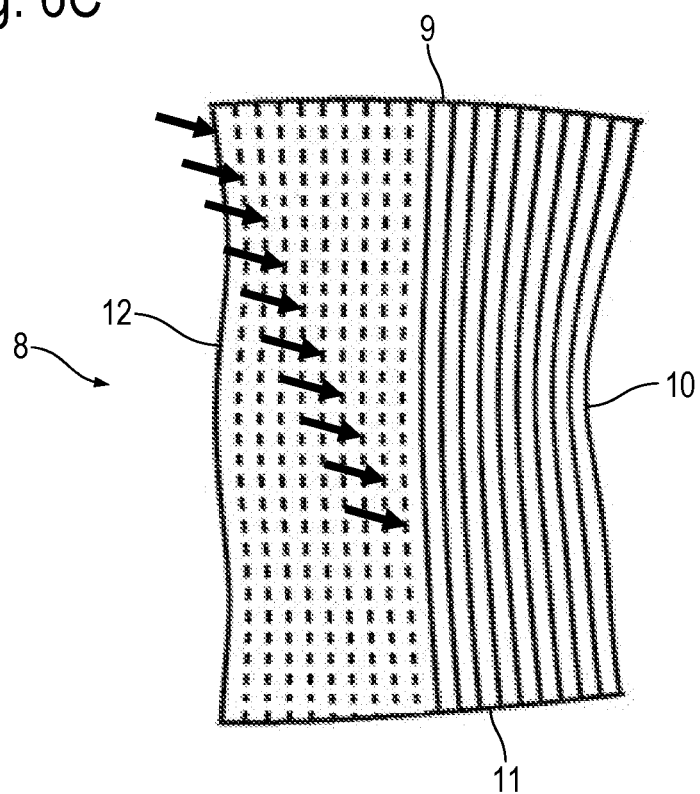

In step S13, the application of the second sub-region B is then carried out, as shown in FIG. 6D.

The above examples of the processing of a roof surface are only exemplary. In the same way, any other surface, e.g. of a motor vehicle body, can be measured and coated, for example A-pillar, roof spar or C-pillar.

The disclosure is not limited to the embodiments described above. Rather, the disclosure also encompasses a large number of variants and variations which also make use of the inventive idea and therefore fall within the scope of protection. In particular, the disclosure also claims protection for the subject-matter and the features of the dependent claims independently of the claims referred to in each case. The disclosure thus comprises various aspects of disclosure which enjoy protection independently of one another.

The invention claimed is:

1. A coating method for coating a component with a coating agent, comprising:
   a) specifying at least one coating path for moving a paint impact point of an application device along the specified at least one coating path over the surface of the component to be coated, the at least one coating path running through a surface region of the component to be coated which is bounded by edges,
   b) presetting one of a plurality of reference values for a plurality of spatial edge point positions on the edges of the surface region,
   c) measuring one of a plurality of spatial end point positions of the component to be coated with a measuring system to create a plurality of measured values,
   d) determining a deviation between the measured values and the reference values, and
   e) adapting the coating path as a function of the deviation between the reference values of the edge points and the measured values of the edge points, wherein
   f) the surface region on the component is coated by a first coating robot and a second coating robot,
   g) the surface region on the component is divided into a first sub-region and a second sub-region which are directly adjacent to one another,
   h) the first coating robot applies a delimiting application path between the first and second sub-regions,
   i) the second coating robot measures the second sub-region, including the delimiting application path, and
   j) the second coating robot coats the second sub-region with the coating agent.

2. The coating method according to claim 1, further comprising:
   a) moving an application device along the at least one adapted coating path over the surface of the component to be coated as part of an application movement, and
   b) application of the coating agent by the application device onto the surface of the component to be coated during the movement of the application device along the at least one adapted coating path,
   c) specifying a measuring path for moving the measuring system over the surface of the component to be coated, the measuring path corresponding essentially to the coating path,
   d) moving the measuring system along the predetermined measuring path as part of a measuring movement, the paint impact point of the application device following the predetermined measuring path, and
   e) measuring the spatial end points during the measuring movement along the measuring path.

3. The coating method according to claim 2, wherein the deviations between the spatial position of the paint impact point during the measuring movement and the spatial position of the paint impact point during the application are smaller than 40 mm.

4. The coating method according to claim 2, wherein the application device has essentially the same spatial orientation during the measuring movement as during the application movement.

5. The coating method according to claim 2, wherein
   a) the angular deviations between the orientation of the application device during the measuring movement and the orientation of the application device during the application movement are smaller than 20°, and
   b) the angular deviations between an orientation of at least one individual robot axis during the measuring movement and the orientation of the at least one individual robot axis during the application movement are smaller than 20°.

6. The coating method according to claim 2, wherein
   a) the application movement along the at least one coating path takes place with a specific movement dynamics, b) the measuring movement along the coating path takes place with a certain movement dynamics, and
c) the measuring movement takes place with essentially the same movement dynamics as the application movement.

7. The coating method according to claim 6, wherein
a) the movement dynamics in the measuring movement and in the application movement are essentially the same with regard to the path speed of the paint impact point of the application device, and
b) the movement dynamics in the measuring movement and in the application movement are essentially the same with regard to the path acceleration of the paint impact point of the application device, and
c) the movement dynamics in the measurement movement and in the application movement are essentially the same with regard to the axis positions of the robot axes of the first coating robot, and
d) the movement dynamics in the measurement movement and in the application movement are essentially the same with regard to the axis speeds of the robot axes of the first coating robot, and
e) the movement dynamics during the measuring movement and during the application movement are substantially the same with respect to the axis accelerations of the robot axes of the first coating robot.

8. The coating method according to claim 7, wherein
a) the deviations between the path speed of the paint impact point during the measuring movement and the path speed of the paint impact point during the application movement are smaller than
   a1) 30%, and
   a2) 500 mm/s,
b) the deviations between the path acceleration of the paint impact point during the measurement movement and the path acceleration of the paint impact point during the application movement are smaller than 10%, and
c) the deviations between the axis speeds of the robot axes during the measuring movement and the axis speeds of the robot axes during the application movement are smaller than 10%, and
d) the deviations between the axis accelerations of the robot axes during the measuring movement and the axis accelerations of the robot axes during the application movement are smaller than 10%.

9. The coating method according to claim 1, wherein
a) the number of measured edges of the surface region is between 2 and 8, and
b) the coating path is adapted as a function of the deviation between the reference values and the measured values along the individual edges with at least one of the following:
   b1) an $n^{th}$-order polynomial with n of 1-6,
   b2) a cubic spline,
   b3) a quintic spline,
   b4) a cubic Bezier curve,
   b5) a quintic Bezier curve.

10. The coating method according to claim 1, wherein reference values of the edge point positions are determined on the basis of a CAD model of the component.

11. The coating method according to claim 1, wherein reference values of the edge point positions are measured by a measurement on a reference component.

12. The coating method according to claim 1, wherein
a) the edged surface region on the component to be coated is measured and coated by the first and the second coating robots, the first and the second coating robots arranged on opposite sides of the surface region,
b) the first coating robot measures the entire surface region or one of the first or the second sub-regions spatially with its measuring system,
c) the path of movement is adapted as a function of the spatial measurement by the first coating robot
d) the first coating robot coats the first sub-region with the coating agent.

13. The coating method according to claim 1, wherein at least one boundary of the second sub-region is defined by the outer edge of a coating path.

14. The coating method according to claim 1, wherein the coating path is adapted in such a way that the following tolerances are at least partially compensated for at least one of the following:
a) static positioning inaccuracy of the first coating robot,
b) dynamic positioning inaccuracy of the first coating robot, or
c) temperature-related positioning inaccuracy of the first coating robot.

15. A coating installation for coating a component with a coating agent, having
a) a first multi-axis coating robot,
b) a first application device which is moved by the first coating robot along a predetermined coating path over the surface of the component to be coated,
c) a measuring system for spatial measurement of the component to be coated,
d) a control unit
   d1) for controlling the first application device, and
   d2) for controlling the first coating robot according to the predetermined coating path, so that the application device moves along the predetermined coating path and coats the component on the coating path, and
   d3) for interrogating the measuring system to determine the spatial position of the component to be coated,
e) wherein the control unit controls the first multi-axis coating robot and the first application device and interrogates the measuring system to:
   e1) specify at least one coating path for moving a paint impact point of an application device along the specified at least one coating path over the surface of the component to be coated, the at least one coating path running through a surface region of the component to be coated which is bounded by edges,
   e2) preset one of a plurality of reference values for a plurality of spatial edge point positions on the edges of the surface region,
   e3) measure one of a plurality of spatial end point positions of the component to be coated with the measuring system to create a plurality of measured values,
   e4) determine a deviation between the measured values and the reference values, and
   e5) adapt the coating path as a function of the deviation between the reference values of the edge points and the measured values of the edge points,
f) a second coating robot,
g) a second application device which is moved by the second coating robot,
h) wherein the surface region is divided into a first sub-region and a second sub-region which are directly adjacent to one another, i) wherein the control unit controls the first coating robot and the first application device to apply a delimiting application path between the first and second sub-regions, and j) wherein the control unit controls the second coating robot to measure the second sub-region, including the delimiting application path, and coat the second sub-region with the coating agent.

16. The coating installation according to claim 15, wherein the measuring system is mounted on the coating robot and is moved by the coating robot over the surface of the component to be coated.

17. The coating installation according to claim 15, wherein the measuring system comprises a light section sensor or a camera.

18. The coating installation according to claim 15, wherein the first or second application device is an atomizer.

19. The coating installation according to claim 15, wherein the first or second application device is a substantially overspray-free application device which, in contrast to an atomizer, does not atomize the coating agent but a spatially narrowly limited coating agent jet.

20. The coating installation according to claim 15, wherein the first or second application device is an atomizer and the coating agent is a paint.

21. A coating method for coating a component with a coating agent, comprising:

a) specifying at least one coating path for moving a paint impact point of an application device along the specified at least one coating path over the surface of the component to be coated, the at least one coating path running through a surface region of the component to be coated which is bounded by edges, b) presetting one of a plurality of reference values for a plurality of spatial edge point positions on the edges of the surface region, c) measuring one of a plurality of spatial end point positions of the component to be coated with a measuring system to create a plurality of measured values, d) determining a deviation between the measured values and the reference values, e) adapting the coating path as a function of the deviation between the reference values of the edge points and the measured values of the edge points, and f) adapting the coating path in such a way that temperature-related positioning inaccuracies of the coating robot are at least partially compensated, wherein g) the surface region on the component is coated by a first coating robot and a second coating robot, h) the surface region on the component is divided into a first sub-region and a second sub-region which are directly adjacent to one another, i) the first coating robot applies a delimiting application path between the first and second sub-regions, j) the second coating robot measures the second sub-region, including the delimiting application path, and k) the second coating robot coats the second sub-region with the coating agent.

* * * * *